June 1, 1954   H. CHORLTON   2,679,690
INTERNAL PRECISION WEDGE GAUGE
Filed March 8, 1952   2 Sheets-Sheet 1
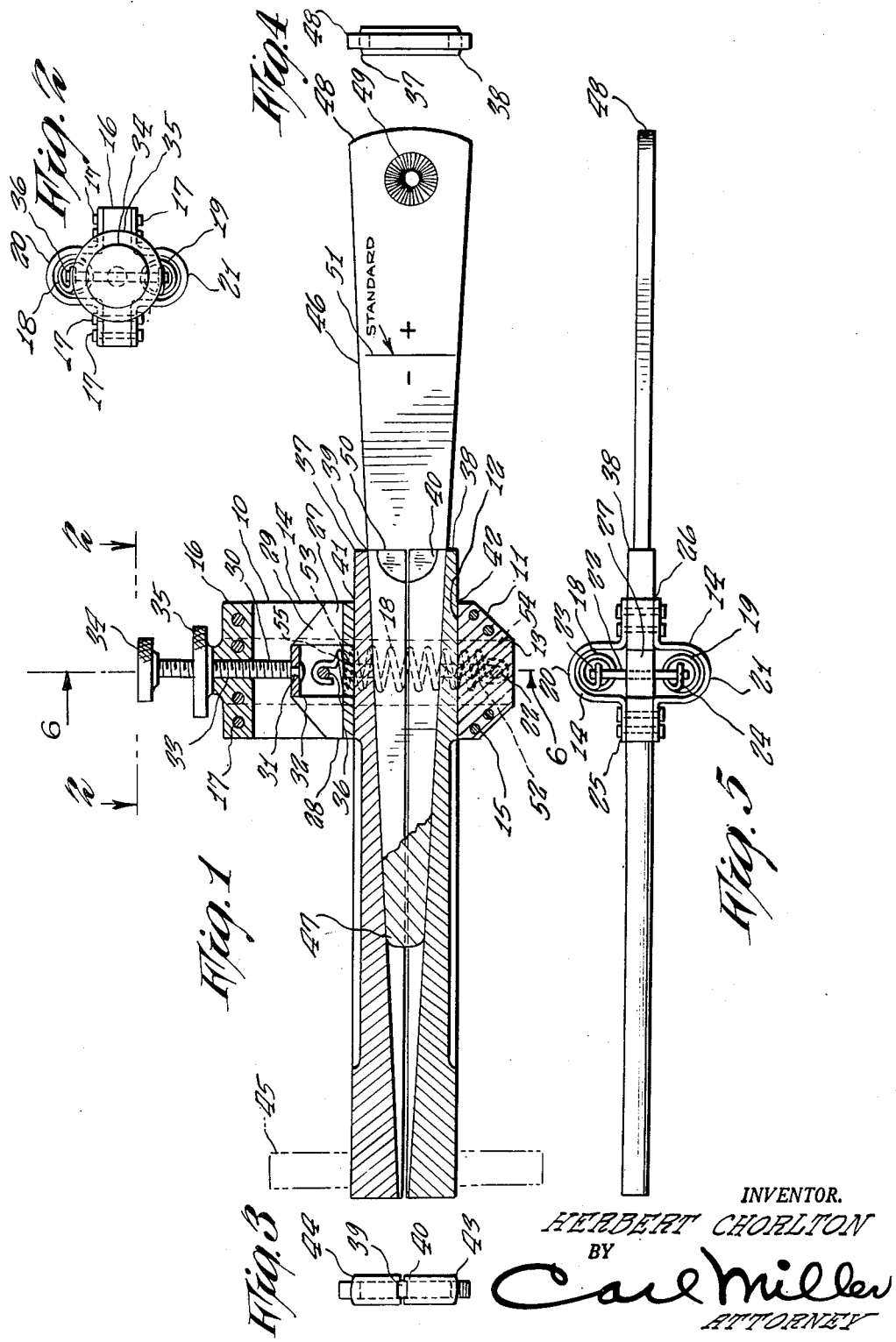
INVENTOR.
HERBERT CHORLTON
BY
Carl Miller
ATTORNEY June 1, 1954     H. CHORLTON     2,679,690
INTERNAL PRECISION WEDGE GAUGE
Filed March 8, 1952     2 Sheets-Sheet 2
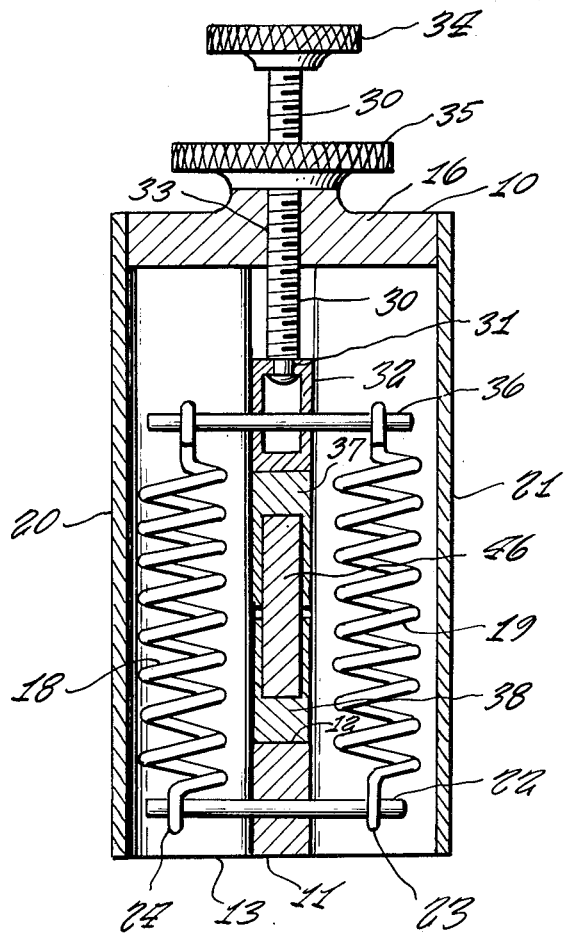
INVENTOR.
HERBERT CHORLTON
BY
Carl Miller
ATTORNEY Patented June 1, 1954

2,679,690

UNITED STATES PATENT OFFICE 2,679,690

INTERNAL PRECISION WEDGE GAUGE

Herbert Chorlton, Huntington, N. Y.

Application March 8, 1952, Serial No. 275,579

2 Claims. (Cl. 33—162)

This invention relates to measuring devices or gauges used in ascertaining precisely internal dimensions.

Such devices generally consist of feeler or probe elements which are expanded by various means to contact the internal surfaces under investigation. The spread between the contacting feeler surfaces is then measured by a micrometer or directly read from an attached indicating means actuated by the feeler expansion. A vexing problem to be overcome in developing such a device is the prevention of feeler or probing element deflection. Naturally if the probing elements are sprung or deformed upon contact with the surface to be measured, the resulting dimension procured will not be precise. In machining fores for shafts or the like, measurements must be made with infinite accuracy to prevent faulty operation and costly wastage of time, labor and material.

A further problem encountered in this field, is to make certain that the feeler measuring surfaces are truly parallel to the measured surfaces. Slight deviations from parallelism at the points of contact, will produce faulty measurements.

Accordingly, it is the prime object of this invention to provide a device which will be free from the inaccuracies accruing from the effects of feeler deflection and non-parallelism.

A further object is to provide a precision gauge comprising probing bars which are reinforced or supported internally to eliminate substantially inward deflection.

A still further object is to provide a precision gauge having probing elements expanded parallelly by means of a tapered key supporting the opposing probing elements internally against inward springing.

A still further object is to provide a parallel probing element expanded by a tapered key, the expansive element movement being confined to parallel paths and the resulting end position being secured by means of a clamping device, said clamping device also providing the means for causing the parallel movement.

A still further object is to provide a precision gauge of the above type wherein the clamping means is biased towards the clamping position.

Other objects and structural details will be apparent from the subjoined description taken in connection with the drawings forming a part of the specification, and in which:

Figure 1 is a sectional elevation view of the assembled device.

Figure 2 is a plan view as seen from the plane 2—2 of Figure 1.

Figure 3 is an end view of the probing portion.

Figure 4 is an end view of the tapered key portion.

Figure 5 is a bottom view.

Figure 6 is a section along the lines 6—6 of Fig. 1.

Referring to the figures, it is seen that the gauge comprises the clamping housing 10 including the lower shoe 11 having the inner planar surface 12 and the outer surface 13. Guide plates 14 are riveted to the lower shoe 11 by means of the rivets 15, and to the yoke 16 by means of the rivets 17. So as to provide a recess for the springs 18 and 19, guide plates 14 include the curved bands 20 and 21. Pin 22 extends through shoe 11 and provides anchorage means for the spring hooks 23 and 24. Guide slots 25 and 26 are provided by plates 14 to restrict the vertical movement of clamping head 27 to a path normal to the planar surface 12. The wings 28 and 29 of the head 27 are formed to snugly fit within the slots 25 and 26, the contacting surfaces being truly parallel. Head 27 is actuated by screw 30 which is swivelled at 31 to the cross bar 32, and threaded to the yoke 16 at the bore 33. A handle 34 is provided for causing rotation of stem 30. Lock nut 35 is provided to prevent the movement of screw 30 from a particular setting. Pin 36 is provided on head 27 to form an upper anchor for springs 18 and 19 which bias the head to the clamping position, thereby ensuring firm contact with the measuring means to be described hereinbelow.

The probing means comprise the opposing bars 37 and 38, having the internal opposing tapered slots 39 and 40 respectively. Bars 37 and 38 are substantially rectangular in cross-section, and include external parallel clamping surfaces 41 and 42 which coact with the shoe surface 12 and the lower head surface to cause a parallel clamping position. At the probing extremity bars 37 and 38 are curved externally at 43 and 44 to provide line contacts with the internal surface of the object 45 to be measured.

The bars 38 and 39 are expanded into contact with the object 45 by the wedge key 46 which includes the forward end 47 and the rear end 48. For precise finger control, it is noted that the rear end 48 includes a serrated indentation 49. Markings 50 and 51 are also provided on the rear end 48 to indicate sizes greater than, less than, or equal, to a particular designated standard.

In operation, key 46 is inserted into the slots 39 and 40, causing the probing bars 37 and 38 to expand into contacting position with the object 45. Bars 37 and 38 can move only parallel to each other, due to their restriction by plate 14.

The bars are then clamped into a fixed position by the movement of shoe 27 and locked by the nut 35.

It is obvious that due to the key 46, any tendency for the probing elements to deflect is prevented.

Moreover the clamping and guiding means allow the probing bars to move only in parallel paths. With the bars fixed at the desired setting, a micrometer can be used to determine the exact dimension. Obviously the screw 30 can be calibrated to give the dimensions directly. So as to prevent longitudinal movement of the bars relative to the shoe 11 and head 27, keeper pins 52 and 53 are located in the shoe and head respectively, and extend into holes 54 and 55 provided in the lower and upper bars.

Because of the simple but rugged construction, the elimination of errors of distortion and nonparallelism, it is obvious the gauge above disclosed is a meritorious improvement over the prior art.

It is desired that it be understood that departures from the above involving merely changes in size, shape and material, fall within the inventive scope.

Having thus set forth and disclosed the nature of the invention, what is claimed is:

1. A measuring gauge for internal dimensions comprising elongated relatively movable probing bars disposed in parallel and opposite arrangement, means for expanding the said bars in parallel opposing directions, the said means including means for preventing inward deflection of the probing end of the said bars, means for uniformly clamping the said bars at any predetermined setting, the said last mentioned means moving in a path normal to the extent of the said bars and having clamping surfaces parallel to the gripped portion of the said bars, the said gripped portion being fully reinforced internally by the first of the said means, the said clamping means comprising a housing carriage including a fixed shoe having a planar inner surface to receive the lower probing back gripped portion, a movable head having an inner gripping surface parallel to the gripped portion of the said bars, said head being disposed above the probing bars and being movable relative to the bars and the shoes, and guide means for restricting the head movement to a path normal to the bar extent, and spring means disposed between the shoe and the head urging the latter towards the said shoe.

2. A clamping means for a measuring gauge for internal dimensions comprising a housing carriage adapted to receive elongated probing bars and including a fixed shoe having a planar inner surface to receive the back of the gripped portion of the lower probing back, a movable head having an inner gripping surface parallel to the gripped portion of the said bars, said head being disposed above the probing bars and being movable relative to the bars and said shoe, and guide means for restricting the head movement to a path normal to the bar extent, and spring means disposed between the shoe and the head urging the latter towards the said shoe.

References Cited in the file of this patent

FOREIGN PATENTS

| Number | Country | Date |
| --- | --- | --- |
| 263,360 | Germany | Nov. 24, 1912 |
| 554,054 | Great Britain | June 17, 1943 |